(12) United States Patent
Yang et al.

(10) Patent No.: US 11,656,779 B2
(45) Date of Patent: May 23, 2023

(54) COMPUTING SYSTEM AND METHOD FOR SHARING DEVICE MEMORIES OF DIFFERENT COMPUTING DEVICES

(71) Applicant: MONTAGE TECHNOLOGY CO., LTD., Shanghai (CN)

(72) Inventors: Ye Yang, Shanghai (CN); Jingzhong Yang, Shanghai (CN); Gang Shan, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 9 days.

(21) Appl. No.: 17/412,273

(22) Filed: Aug. 26, 2021

(65) Prior Publication Data

US 2022/0121383 A1 Apr. 21, 2022

(30) Foreign Application Priority Data

Oct. 21, 2020 (CN) .......................... 202011132146.3

(51) Int. Cl.
| | | |
|---|---|---|
| *G06F 12/00* | (2006.01) | |
| *G06F 3/06* | (2006.01) | |
| *G06F 12/1009* | (2016.01) | |

(52) U.S. Cl.
CPC .......... *G06F 3/0644* (2013.01); *G06F 3/0604* (2013.01); *G06F 3/0673* (2013.01); *G06F 3/0683* (2013.01); *G06F 12/1009* (2013.01)

(58) Field of Classification Search
CPC .... G06F 3/0644; G06F 3/0604; G06F 3/0673; G06F 3/0683; G06F 12/1009; G06F 12/0223; G06F 9/45504; G06F 12/0292
See application file for complete search history.

(56) References Cited

U.S. PATENT DOCUMENTS

| | | | | |
|---|---|---|---|---|
| 5,526,504 A | * | 6/1996 | Hsu ..................... | G06F 12/1027 |
| | | | | 711/209 |
| 6,321,276 B1 | * | 11/2001 | Forin ................... | G06F 12/1081 |
| | | | | 710/5 |
| 10,191,861 B1 | * | 1/2019 | Steinberg ............ | G06F 9/45558 |
| 10,929,308 B2 | * | 2/2021 | Sandberg .............. | G06F 3/0659 |

(Continued)

*Primary Examiner* — John A Lane
(74) *Attorney, Agent, or Firm* — Jun He Law Offices P.C.; James J. Zhu

(57) ABSTRACT

A computing system includes a host computing device and a slave computing device. The host computing device comprises a host processor, a host device memory and a host address mapping management. The host address mapping management manages a system memory page table, and converts, in response to a data access request from a processing process run on the host processor, requested virtual addresses into host device physical addresses based on the system memory page table to allow the processing process to access corresponding host storage units. The slave computing device includes a slave processor callable by the host processor to assist the host processor in running the processing processes, a slave device memory and a slave address mapping management unit. The slave address mapping unit converts, in response to a data access request of the processing process, requested virtual addresses into slave device physical addresses based on the slave device memory page table, to allow the slave processor to access corresponding slave storage units to assist the host processor in running the processing process.

13 Claims, 4 Drawing Sheets

(56) References Cited

U.S. PATENT DOCUMENTS

| | | | |
|---|---|---|---|
| 2006/0161704 A1* | 7/2006 | Nystad | G06F 9/54 |
| | | | 710/105 |
| 2009/0292899 A1* | 11/2009 | Mansell | G06F 12/1009 |
| | | | 711/207 |
| 2014/0380003 A1* | 12/2014 | Hsu | G06F 9/5033 |
| | | | 718/102 |
| 2015/0301951 A1* | 10/2015 | Bybell | G06F 12/1027 |
| | | | 711/207 |
| 2018/0203806 A1* | 7/2018 | Moudgill | G06F 12/1027 |
| 2019/0258403 A1* | 8/2019 | Kim | G06F 13/385 |
| 2020/0379791 A1* | 12/2020 | Tsirkin | G06F 3/0646 |

* cited by examiner

| Process Identifier ID | Virtual Address | Physical Address | Access Authority |
|---|---|---|---|
| 001 | 0x00400000-0x0040FFFF | 0xFF400000-0xFF40FFFF | Readable |
| 002 | 0x00410000-0x0041FFFF | 0xFF410000-0xFF41FFFF | Writable |
| 003 | 0x00420000-0x0042FFFF | 0xFF420000-0xFF42FFFF | Executable/Readable/Writable |
| ... | ... | ... | ... |

FIG. 3

COMPUTING SYSTEM AND METHOD FOR SHARING DEVICE MEMORIES OF DIFFERENT COMPUTING DEVICES

FIELD OF THE INVENTION

The present application relates to the field of computer technology, and more specifically, to a computing system and a method for sharing device memories of different computing devices in the computing system.

BACKGROUND

As the types of memory become more diversified, nowadays it becomes more difficult for device memories (or referred to as "main memories") configured in computer servers (hereinafter referred to as hosts or host devices) to meet the needs of different kinds of applications in terms of capacity, performance, and characteristics. Therefore, a variety of computing devices and computing systems have been developed. Some computing devices can be independent of host devices, having their own main memories and computing or processing units and being only interconnected with host devices through various buses. Such independent computing devices can generally be referred to as "discrete computing devices". For example, graphics processing unit (GPU) cards, field programmable gate array (FPGA) accelerator cards, etc. are all discrete computing devices, which can assist host processors in various data processing and computations, and can also support multiple independent virtual computers (hereinafter referred to as "virtual machines") on host devices through virtualization of such physical devices.

However, in an existing computing system equipped with multiple discrete computing devices, the collaborative data access efficiency of device memories of these computing devices is low. Therefore, it is desired to provide an improved method for sharing device memories.

SUMMARY

An objective of the present application is to provide a method for sharing device memories of different computing devices in a computing system.

According to some aspects of the present application, a computing system is provided, comprising: a host computing device for running one or more processing processes; a host device memory having a plurality of host storage units that can be addressed and accessed through respective host device physical addresses, and the host device memory storing, for each processing process, a system memory page table indicating mapping relationships between virtual addresses of the processing process and system physical addresses, wherein the host device physical addresses are a part of the system physical addresses; and a host address mapping management unit for managing the system memory page table, and for converting, in response to a data access request from a processing process run on the host processor, requested virtual addresses into host device physical addresses based on the system memory page table to allow the processing process to access corresponding host storage units; a slave computing device, which is coupled to the host computing device through a data bus to exchange data therewith, wherein the slave computing device comprises: a slave processor callable by the host processor to assist the host processor in running the processing processes; a slave device memory having a plurality of slave storage units that can be addressed and accessed through respective slave device physical addresses, wherein the slave device physical addresses are a part of the system physical addresses; wherein the slave device memory stores a slave device memory page table including at least a part of the system memory page table, and the part of the system memory page table comprises mapping relationships between virtual addresses and system physical addresses which is requested and received by the slave computing device from the host computing device according to a data access request of a processing process run on the slave computing device, wherein the mapping relationships are used for the processing process, and the slave device memory page table comprises mapping relationships between virtual addresses of data requested to be accessed and slave device physical addresses; and a slave address mapping management unit for converting, in response to a data access request of the processing process, requested virtual addresses into slave device physical addresses based on the slave device memory page table, to allow the slave processor to access corresponding slave storage units to assist the host processor in running the processing process.

In some embodiments, the slave device memory page table is updated when the system memory page table is updated.

In some embodiments, the processing process is a virtual machine process, and the virtual addresses are virtual machine physical addresses provided by the virtual machine process; wherein the host device memory is configured to further store a virtual machine memory page table that represents mapping relationships between virtual machine virtual addresses and virtual machine physical addresses, and wherein the slave device memory page table comprises mapping relationships between virtual machine virtual addresses and slave device physical addresses.

In some embodiments, each mapping relationship between a virtual address and a system physical address in the slave device memory page table is associated with a corresponding processing process, and the slave address mapping management unit is configured to only allow each processing process to access system physical addresses based on the mapping relationships between virtual addresses and system physical addresses which are associated with the processing process.

In some embodiments, each mapping relationship between a virtual address and a system physical address in the slave device memory page table is associated with a corresponding processing process and a corresponding access authority, and the slave address mapping management unit is configured to only allow each processing process to access system physical addresses based on the mapping relationships between virtual addresses and system physical addresses and access authorities which are associated with the processing process.

In some embodiments, the data access request comprises a process identifier to indicate a processing process requesting access and a virtual address requested to be accessed.

In another aspect of the present application, a method for sharing device memories of different computing devices in a computing system is also disclosed. The computing system comprises a host computing device having a host device memory and a slave computing device having a slave device memory, and the slave computing device is coupled to the host computing device through a data bus to exchanged data therewith. The method comprises: storing, for each processing process, a system memory page table representing mapping relationships between virtual addresses and system physical addresses in the host device memory, wherein the system physical addresses comprise host device physical addresses for addressing and accessing respective host storage units in the host device memory and slave device physical addresses for addressing and accessing respective slave storage units in the slave device memory; storing a slave device memory page table in the slave device memory, wherein the slave device memory page table comprises at least a part of the system memory page table which comprises mapping relationships between virtual addresses and system physical addresses that are requested and received by the slave computing device from the host computing device according to a data access request of a processing process run on the slave computing device, wherein the mapping relationships are used for the processing process, and the slave device memory page table comprises mapping relationships between virtual addresses of data requested to be accessed and slave device physical addresses; and converting requested virtual addresses into slave device physical addresses based on the slave device memory page table by a slave address mapping management unit of the slave computing device in response to a data access request of the processing process run on a slave processor, to allow the slave processor to access corresponding slave storage units to assist the host processor in running the processing process.

The computing system of the present application can share to a host computing device and a virtual machine program running thereon a device memory of a slave computing device coupled to a data bus of the system, and the device memory of the slave computing device and a host device memory can be unified into a system physical address space, and the host computing device can establish a virtual machine virtual address space corresponding to a virtual machine program to implement data access. At the same time, the slave processor on the slave computing device can also access a local device memory through a part of the virtual addresses in the virtual machine virtual address space therein. Such a unified address space access capability can improve the flexibility of data distribution in the memories of different devices and simplify the programming. In addition, the slave computing device can directly access slave device physical addresses through the locally mirrored virtual addresses without translating the virtual addresses into the slave device physical addresses by the host computing device, thereby ensuring the full utilization of the computing capability of the slave computing device.

In addition, functional requirements of mapping management units (MMU) modules used in a slave computing device of this application are relatively simple, i.e. the MMU module only needs to realize three functions including page table requesting, page table storage, and page table translation and does not require a complete MMU management function. Thus, the implementation cost for the MMU modules is low. In addition, the mirrored page table and data are stored locally on the slave computing device with better performance.

The above is an overview of the application, which may be simplified, summarized and omitted in detail. Therefore, those skilled in the art should realize that this part is only illustrative and is not intended to limit the scope of the application in any way. This summary section is neither intended to determine the key features or essential features of the claimed subject matter, nor is it intended to be used as an auxiliary means to determine the scope of the claimed subject matter.

BRIEF DESCRIPTION OF THE DRAWINGS

The above and other features of the present application will be more fully understood from the following description and appended claims. It will be appreciated that these drawings depict only several embodiments of the present application, therefore not to be considered as limiting the scope of the present application. The content of the present application will be more clearly and in detail explained by the accompanying drawings.

FIG. 3 illustrates an example of mapping relationships between virtual addresses and system physical addresses according to an exemplary embodiment of the present application.

DETAILED DESCRIPTION OF THE DRAWINGS

Figure 1:
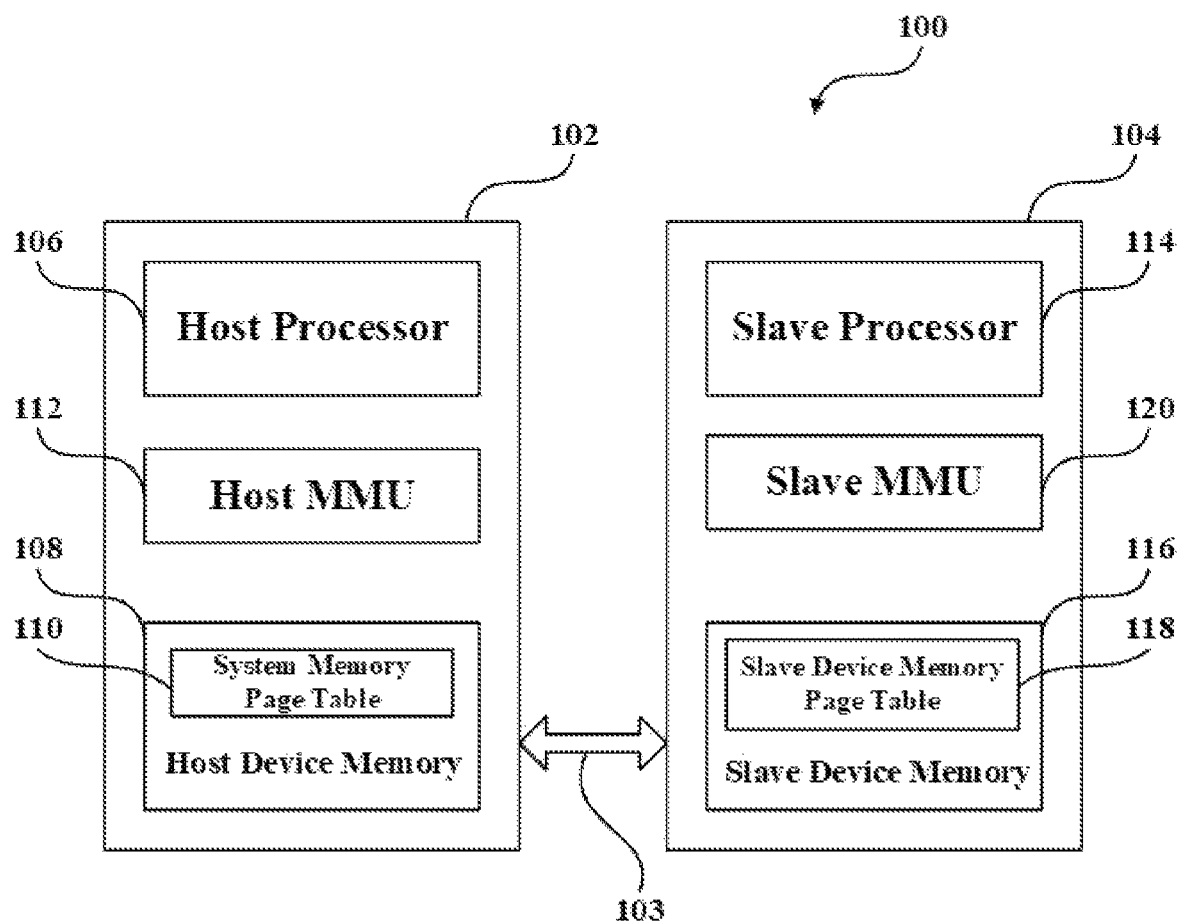
FIG. 1 shows a computing system 100 according to an embodiment of the present application.

In the following detailed description, reference is made to the accompanying drawings that form a part thereof. In the drawings, like symbols generally indicate like components unless the context indicates otherwise. The illustrative embodiments described in the detailed description, drawings, and claims are not intended to be limiting. Other embodiments may be utilized, and other changes may be made, without departing from the spirit or scope of the subject matter of the application. It is to be understood that the various aspects of the subject matter of the present invention, which are generally described in the present application and illustrated in the accompanying drawings, can be configured, substituted, combined, and designed, all of which clearly constitute the content of the present application.

FIG. 1 shows a computing system 100 according to an embodiment of the present application. The computing system 100 illustrated in FIG. 1 exemplarily includes a host computing device 102 and a slave computing device 104, both of which have data processing capabilities and storage capabilities. In some other embodiments, the computing system may also include more slave computing devices, which can implement accessing and processing of their local data under the control of the host computing device. A data bus 103 is used to couple the host computing device 102 and the slave computing device 104 to exchange data therebetween. In some embodiments, the data bus 103 may conform to various data bus standards, such as PCI (Peripheral Component Interconnect), PCIe (Peripheral Component Interconnect express, including PCIe Gen1, PCIe Gen2, PCIe Gen3, PCIe Gen4 and future PCIe standards, etc.), CCIX (Cache Coherent Interconnect for Accelerators), CXL (Compute Express Link), Gen-Z (Generation Z standard) or USB (Universal Serial Bus) standard, etc.

As illustrated in FIG. 1, the host computing device 102 includes a host processor 106, which can run one or more processing processes. In some embodiments, each processing process may be assigned a process identifier for uniquely identifying the process, so that the host computing device 102 and the slave computing device 104 can distinguish between different processing processes based on their respective process identifiers. It can be understood that each processing process is a dynamic process of a program running on the computing system 100. In some cases, when a termination condition specified by a corresponding program is met, the execution of a certain processing process can be terminated; after that, if the program is called and a new dynamic processing process is generated, the new processing process can be assigned a process identifier that is different from the previous process identifier. On the other hand, if the execution of the processing process does not meet the termination condition specified by the corresponding program, the process identifier corresponding to the processing process can be reserved for identifying the processing process. The host computing device 102 also includes a host device memory 108, which may include a plurality of host storage units that can be addressed and accessed through respective host device physical addresses. In some embodiments, a plurality of host storage units may be configured as one or more storage arrays or storage modules.

Similarly, the slave computing device 104 includes a slave processor 114, which can be called by the host processor 106 to assist the host processor 106 in running some processing processes. The slave computing device 104 also has a slave device memory 116, which may include a plurality of slave storage units that can be addressed and accessed through respective slave device physical addresses. In some embodiments, the plurality of slave storage units may be configured as one or more storage arrays or storage modules. In some embodiments, the slave computing device 104 may be, for example, a graphics processing unit (GPU) device or an FPGA accelerator card for processing display or graphics data.

In the embodiment illustrated in FIG. 1, in order to facilitate sharing data storage, the host device physical addresses of the host device memory 108 and the slave device physical addresses of the slave device memory 116 can be uniformly programmed, thereby forming a uniformly programmed system physical address space. In other words, the host device physical addresses and the slave device physical addresses are respectively parts of a system physical address space. In this way, when performing process processing, the host computing device 102 and the slave computing device 104 can access the host device memory 108 or the slave device memory 116 through the uniformly programmed system physical addresses, without the need to perform physical address conversion between devices.

Generally, before running a processing process, the host computing device 102 generates a virtual address space consisting of virtual addresses for the processing process, and only allows the processing process to access these virtual addresses, and does not allow the processing process to directly access the physical addresses. Therefore, the host device memory 108 may store a system memory page table 110 indicating mapping relationships between the virtual addresses and the system physical addresses, wherein the mapping relationships are used for the corresponding processing process. And the host computing device 102 may also have a host address mapping management unit (host MMU) 112. In this way, when a processing process running on the host processor 106 needs to access the host device memory 108, in response to a data access request sent by the running processing process, the host MMU 112 can convert the requested virtual addresses to the corresponding host device physical addresses to allow the processing process to access the corresponding host storage units based on the system memory page table 110. It can be understood that the host computing device 102 or the slave computing device 104 (described below) may run multiple processing processes. Accordingly, the system memory page table 110 may include the mapping relationships between the virtual addresses and the system physical addresses, wherein the mapping relationships are associated with the respective processing processes. Generally, different processing processes do not share virtual addresses therebetween.

Similarly, the slave device memory 116 may store a slave device memory page table 118 representing mapping relationships between virtual addresses and slave device physical addresses, wherein the mapping relationships are associated with at least a part of processing processes. And the slave computing device 104 is also provided with a slave address mapping management unit (slave MMU) 120. The slave device memory page table 118 at least includes a part of the system memory page table 110, and the part includes a portion of the mapping relationships between the virtual addresses and system physical addresses included in the system memory page table 110 which are received from the host computing device 102 and are requested by the slave processor according to data access requests from the processing processes running on the slave processor. Specifically, when the host computing device 102 instructs the slave computing device 104 to assist in running the processing processes, the slave processor 114 may need to access data stored in the slave device memory 116. In some embodiments, the host computing device 102 can provide the slave computing device 104 with virtual addresses of data stored in the slave device memory 116, wherein the slave processor 114 is requested to access the data. Accordingly, the slave computing device 104 can passively generate data access requests based on the virtual addresses. In other embodiments, the slave computing device 104 can actively determine that certain data stored in the slave device memory 116 needs to be accessed according to the needs of the processing processes to be executed, and then determine the virtual addresses of the data that needs to be accessed. Therefore, data access requests can be generated according to the virtual addresses determined by the slave computing device 104. Correspondingly, the slave computing device 104 can send to the host computing device 102 data access requests including the virtual addresses corresponding to the data that is actively or passively requested to be accessed. After receiving the data access requests, the host computing device 102 can identify the virtual addresses of the data requested to be accessed, and the mapping relationships between the virtual addresses and the slave device physical addresses in the system memory page table 110 are sent to the slave computing device 104. Then, the slave computing device 104 can store in the slave device memory 116 the received mapping relationships between the virtual addresses and the slave device physical addresses as the slave device memory page table 118. In this way, the slave MMU 120 can convert the requested virtual addresses into the slave device physical addresses based on the address mapping relationships included in the slave device memory page table 118, so as to allow one or more processing processes running by the slave processor 114 to access the corresponding slave storage units.

It can be seen that, in the above embodiment, the computing system 100 uniformly allocates and manages the system physical address space of the host computing device 102 and the slave computing device 104 for data storage, and uses the slave device memory page table 118 to essentially "mirror" or copy a part of the address mapping relationships related to the data requested by the slave processor 114 in the system memory page table 110. This avoids a large scale of data transfer between devices during the execution of one or more processing processes, and improves the computing efficiency of the devices. In addition, the slave device memory 116 only needs to dynamically store a part of the relevant address mapping relationships according to the actual needs of the processing processes, which also improves the use efficiency of the page table and reduces resource occupation.

Figure 2:
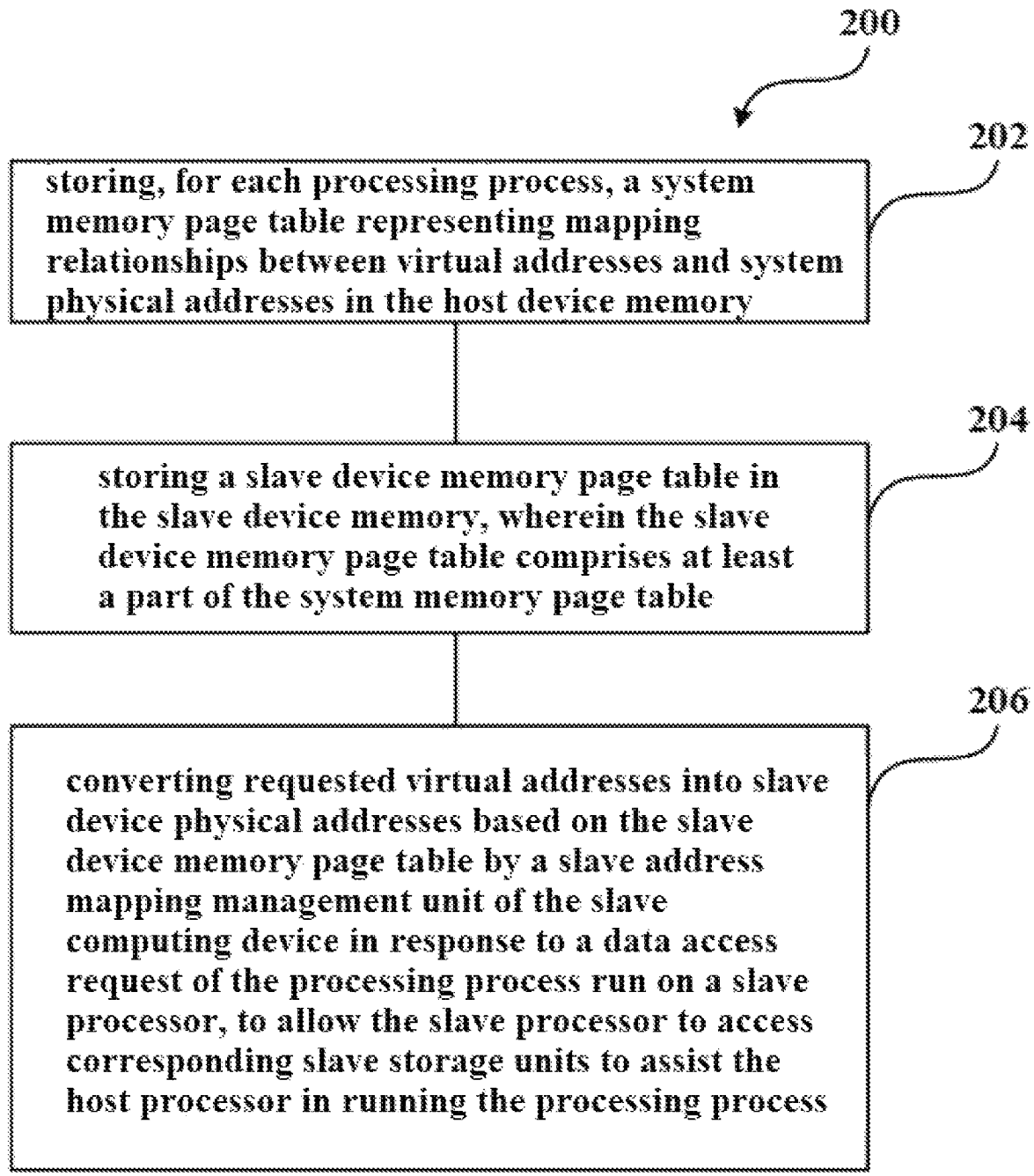
FIG. 2 illustrates a method for sharing device memories of different computing devices in a computing system according to an embodiment of the present application.

FIG. 2 illustrates a method 200 for sharing device memories of different computing devices in a computing system according to an embodiment of the present application. In some embodiments, the method 200 may be implemented by the computing system 100 illustrated in FIG. 1. Next, the method 200 will be further described with FIG. 1 and FIG. 2.

It should be noted that, in the computing system 100, the slave computing device 104 can share its local slave device memory 116 with the host computing device 102 through the data bus 103, so that the slave device memory 116 can logically be regarded as a part of the memory of host computing device 102, that is, the slave device memory 116 and the host device memory 110 together constitute a system storage space or a system physical address space. Correspondingly, the system physical address includes the host device physical addresses used to address and access the host storage units in the host device memory 108, and the slave device physical addresses used to address and access the slave storage units in the slave device memory 116. Theoretically, both the host processor 106 and the slave processor 114 can access corresponding storage units through the respective system physical addresses. However, in an actual operation, it is usually desired to establish a corresponding virtual address space for each processing process to be run, and the processing process can access the corresponding system physical addresses via the corresponding virtual addresses in the virtual address space.

Accordingly, the method includes step 202 of storing, in the host device memory 108 of the host computing device 102, the system memory page table 110 representing mapping relationships between virtual addresses corresponding to system physical addresses and the system physical addresses, where each processing process is assigned with a set of corresponding virtual addresses. Specifically, the operating system, application programs, and processes of the host computing device 102 can manage and allocate all or a portion of the physical address space of the device memories in the computing system 100, thereby establishing the system memory page table 110 and storing it in the host device memory 108. According to a change in the operating state of the processing process or other operating conditions and situations, the mapping relationships included in the system memory page table 110 and between the virtual addresses and the system physical addresses may change, for example, may be added, deleted or replaced. When the processing process run on the host computing device 102 needs to access the host device memory 108, the host processor 106 may, in response to a data access request sent by the processing process, convert the requested virtual addresses into host device physical addresses based on the system memory page table 110 and through the host MMU 112, thereby allowing the processing process to access the target physical addresses of the host device memory 108.

In some cases, the host computing device 102 may assign a part or all of a processing tasks to the slave computing device 104, with the assigned portion of task processed by the slave processor 114. Correspondingly, when the host computing device 102 instructs the slave computing device 104 to run a specific processing process and then the processing process to be run needs to access the slave device memory 116, the computing system 100 can establish a slave device memory page table 118 and store the slave device memory page table 118 in the slave device memory 116, as illustrated in step 204.

Specifically, the slave computing device 104 can send a data access request carrying corresponding virtual address (es) to the host computing device 102. After receiving the data access request, the host computing device 102 can identify the virtual addresses of the data requested to be accessed, and transfer to the slave computing device 104 the mapping relationships between the virtual addresses and the slave device physical addresses, which are included in the system memory page table 110, so that the slave computing device 104 can store in the slave device memory 116 the received mapping relationships between the virtual addresses and the slave device physical addresses as the slave device memory page table 118.

In some embodiments, one or more processing processes which are requesting data and currently running on the slave processor 114 of the slave computing device 104 may be assigned unique process identifiers, which may be uniformly assigned by the operating system, and the virtual addresses are also uniformly allocated based on the one or more processing processes. Namely, a certain processing process can only access one or more determined virtual addresses allocated by the system. Therefore, the mapping relationships between the virtual addresses and the system physical addresses, which are stored in the system memory page table 110, can also be associated with respective processing processes, and each of the processing processes can only access the virtual addresses associated therewith. FIG. 3 illustrates an example of the mapping relationships between virtual addresses and system physical addresses according to an exemplary embodiment of the present application. For example, a process ID "001" is only associated with virtual addresses "0x00400000-0x0040FFFF", which means that a processing process identified by ID "001" can only access the aforementioned virtual addresses to obtain the corresponding data. It can be seen that each virtual address-physical address mapping relationship is also associated with the identifier of a processing process, and optionally, is further associated with a preset access authority (for example, readable, writable, or executable/run, etc.). It can be understood that the access authority can be an allowable authority similar to a whitelist, that is, access operations other than the listed access authority or authorities are not allowed, as illustrated in FIG. 3. The access authority can alternatively be a forbidden access authority similar to a blacklist, that is, access operations other than the listed access authority or authorities are not allowed. The access authority will be further explained below.

In this way, in the process of establishing the slave device memory page table 118 illustrated in step 204, the slave computing device 104 can carry a process identifier in a data access request issued thereby. Correspondingly, the host computing device 102 may first verify the process identifier in the process of responding to the data access request, and determine whether to provide the requested address mapping relationships to the slave device memory 116 according to the identifier verification result. Specifically, the host computing device 102 may retrieve the pre-stored mapping relationships in the system memory page table 110 which are corresponding to the process identifier, according to the process identifier carried in the data access request (for example, as illustrated in the example of FIG. 3). If the process identifier is retrieved from the pre-stored mapping relationships, it can be determined that the processing process corresponding to the data access request has passed the verification. It can be understood that if the verification fails, that is, the processing process with the identifier does not have access authority to the virtual addresses corresponding to the identifier, the host computing device 102 may not provide the requested address mapping relationships to the slave computing device 104. On the contrary, if the identifier verification succeeds, the host computing device 102 may provide the requested address mapping relationships to the slave computing device 104, thereby storing the corresponding slave device memory page table 118 in the slave device memory 116.

It can be understood that, in some embodiments, the slave device memory page table 118 is a mirrored page table established based on the mapping relationships (or called memory page mapping entries) which are dynamically requested from the host computing device 102, by a processing process run on the slave computing device 104. Thus, the slave device memory page table 118 is not necessarily a page table as complete as the system physical address space, but only a temporary mirroring of a part or all of the slave device physical addresses associated with the slave device memory 116 in the system memory page table 110. The mirrored page table forms the mapping relationships between the virtual addresses generated by the host computing device 102 and the physical addresses of the slave device memory 116 in the slave computing device 104.

Next, in step 206, in response to the data access request of the processing process run on slave processor 114, the slave address mapping management unit 120 of the slave computing device 104 converts the requested virtual addresses into slave device physical addresses based on the slave device memory page table 118, thereby allowing the slave processor 114 to access the corresponding slave storage units to assist the host processor 106 in running the processing process.

It can be understood that the slave device memory 118 can store multiple address mapping relationships similar to those illustrated in FIG. 3, and the slave MMU 120 can retrieve the corresponding slave device physical addresses according to the processing processes indicated by the specific process identifiers and the respective requested virtual addresses requested by the processing processes, and instruct the slave processor 114 to access the slave device physical addresses as requested. In the example illustrated in FIG. 3, each address mapping relationship may include a corresponding access authority, such as readable, writable, or executable. In this case, when the slave MMU 120 retrieves the slave device physical addresses in response to a data access request provided by the slave processor 114, it can further verify whether the access authority included in the data access request is consistent with an access authority included in the slave device memory page table. If they are inconsistent, it means that the data access request is not legal. Therefore, the data access request can be restricted or prohibited, that is, the slave processor 114 is not allowed to access the slave device memory 116 based on the request. Only when the access authority included in the data access request is consistent with an access authority included in the slave device memory page table, the access operation is allowed to continue.

It can be understood that, with the operation of the computing system 100, one or more address mapping relationships in the system memory page table 110 may be updated, such as being deactivated, deleted, replaced, or added. In particular, when the address mapping relationships associated with one or more slave device physical addresses of the slave device memory 116 are updated due to the management of a host process or an operating system by itself, the host computing device 102 may send an address update message to the slave computing device 104, and the message contains the change of the related address mapping relationship. After receiving the message, the slave computing device 104 may update the corresponding one or more address mapping relationships in the slave device memory page table 118 stored in slave device memory 116 to keep the relationships of the two page tables consistent. It should be noted that in some cases, the update synchronization process between the system memory page table 110 and the device memory page table 118 may not be timely enough, so that the two cannot be completely consistent. For example, when the slave computing device 104 is accessing one or more virtual address mapping relationships but the corresponding mapping relationships in the system memory page table 110 may be currently updated, this may result in inconsistencies between the two tables, as well as unpredictable results. In some embodiments, certain error correction mechanisms or verification mechanisms can be used to avoid such inconsistency problems.

Similarly, one or more address mapping relationships in the system memory page table 110 may be updated. For example, the range of virtual addresses that can be accessed by a certain processing process may changes, or the access authority to a specified virtual address may change for a processing process. In this case, in some embodiments, the host computing device 102 may notify the slave computing device 104 of the update after the address mapping relationship is updated, and send a updated address mapping relationship to the slave computing device 104. Accordingly, a corresponding mapping relationship in slave device memory page table 118 may be adjusted or updated based on the received updated address mapping relationship. In other embodiments, the host computing device 102 may periodically notify the slave computing device 104 of the update of the mapping relationship(s). The higher the update frequency of the mapping relationships is, the more consistent the page tables between the host computing device 102 and the slave computing device 104 may be. In some embodiments, to avoid the problem of unsynchronized update of the page tables, when the slave computing device 104 finds that a certain data access request does not have an authority after retrieving the mapping relationship(s) stored in the slave device memory page table 118, the slave computing device 104 may request the host computing device 102 for the mapping relationship stored in the host computing device 102 to verify whether the unfound authority is accurate.

In short, the slave device memory page table can be updated as the system memory page table is updated. It can be understood that when the mapping relationships in the system memory page table is updated or changed but is irrelevant to a certain slave computing device, the slave device memory page table for the slave computing device may not be updated.

Figure 4:
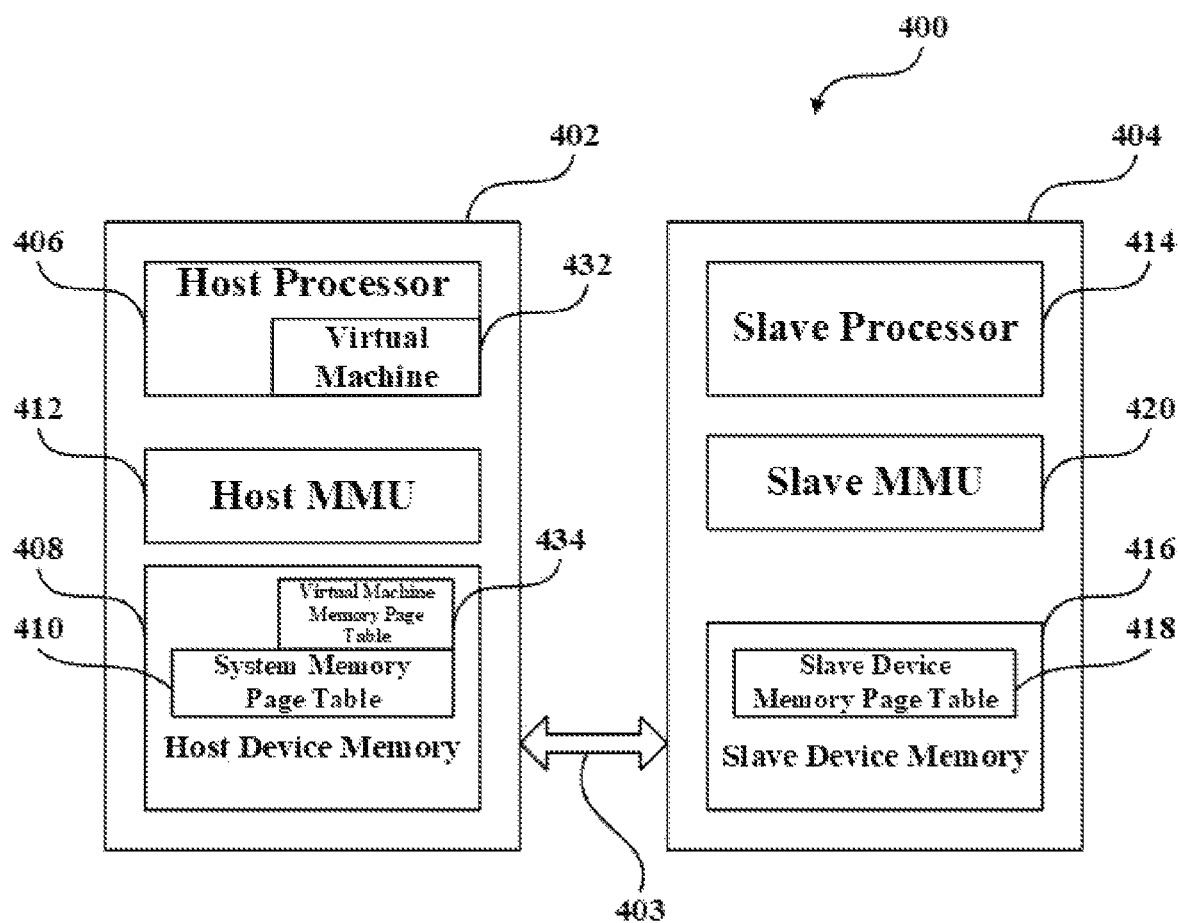
FIG. 4 shows a computing system according to another embodiment of the present application.

FIG. 4 shows a computing system 400 according to an embodiment of the present application. Compared with the computing system 100 illustrated in FIG. 1, the computing system 400 illustrated in FIG. 4 runs one or more virtual machine processes or programs 432. The virtual machine program 432 can generate a virtual machine memory page table 434, which includes mapping relationships between virtual machine virtual addresses and virtual machine physical addresses. A virtual machine memory page table 434 may similarly be stored in a host device memory 408.

For a processing process run on the computing system 400 other than the virtual machine program 432, when the processing process requires a slave processor 414 of a slave computing device 404 to assist in executing the process and accessing a slave device memory 416, operation processes which are similar to those operations of the slave computing device 104 in the computing system 100 as illustrated in FIG.1 may be performed, which will not be elaborated herein. The following mainly describes operations when the virtual machine program 432 needs to call the slave computing device 404 to execute related processing processes.

As mentioned above, the virtual machine program 432 may establish the virtual machine memory page table 434 indicating mapping relationships between the virtual machine virtual addresses and the virtual machine physical addresses. Therefore, the virtual machine program 432 needs to face two levels of page table when accessing the host device memory or the slave device memory, i.e. the virtual machine memory page table 434 and the system memory page table 410. When the virtual machine program 432 needs to access data stored in the host device memory or the slave device memory, the host MMU 412 would use the two levels of page table 434 and 410 to first convert the virtual machine virtual addresses corresponding to the requested data into the virtual machine physical addresses, and to further convert the virtual machine physical addresses (which are still virtual addresses, not system physical addresses directed to the host device memory 408 or the slave device memory 416) into the system physical addresses. It can be understood that, depending on the data storage location, the converted system physical addresses may be host device physical addresses or slave device physical addresses.

In some cases, the slave computing device 404 may assist the virtual machine program 432 in executing the processing processes and needs to access data stored in the slave device memory 416. At this time, the virtual machine program 432 may send a notification to the host computing device 402 and the slave computing device 404 to indicate that the data stored in the slave device memory 416 may be accessed. Correspondingly, the host MMU 412 may use the virtual machine virtual addresses to identify the slave device physical addresses associated with the virtual machine virtual addresses through the two levels of page table, thereby sending the address mapping relationships between the virtual machine virtual addresses and the slave device physical addresses to the slave computing device 404. After receiving the address mapping relationships, the slave computing device 404 stores them in the slave device memory 416 as at least a part of the slave device memory page table 418. After that, the slave computing device 404 may send a data access request including the virtual machine virtual addresses to the host computing device 402 as needed. In this way, the slave processor 414 can access the corresponding slave device physical addresses based on the slave device memory page table 418. It can be seen that although the host computing device 402 includes two levels of page table, the slave device memory page table 418 may only include one level of page table, that is, the mapping relationships between the virtual machine virtual addresses and the slave device physical addresses, which is based on the two levels of page table on the host computing device 402. Alternatively, the slave device memory page table 418 may also include two levels of page table, which can be similar to the structure and corresponding relationships of the two levels of page table 434 and 410.

The computing system of the present application can share with a host computing device and a virtual machine program running thereon a device memory on a slave computing device which is coupled to the host computing device through a data bus of the computing system, and the device memory on the slave computing device and a host device memory of the host computing device are unified into a system physical address space. The host computing device can establish a virtual machine virtual address space corresponding to a virtual machine program for data access. At the same time, the slave processor on the slave computing device can also access a local device memory through a part of the virtual addresses in the virtual machine virtual address space therein. Such unified address space access capability can improve the flexibility of data distribution in the memories of different devices and simplify the complexity of programming. In addition, the slave computing device can directly access the slave device physical addresses via the locally mirrored virtual addresses without translating the virtual addresses into the slave device physical addresses by the host computing device. Therefore, the computing power of the slave computing device can be fully utilized.

In addition, the requirement on the functions of the MMU module used in the slave computing device of this application are relatively simple, i.e., the MMU module only needs to realize three functions including page table request, page table storage and page table translation. The MMU module used in the slave computing device does not need a complete MMU management function, and thus the implementation cost is low. In addition, the mirrored page table and data are stored locally on the slave computing device and the performance is better.

In the present application, the management of adding and deleting mirrored page tables is actually coordinatively implemented by the software running on the host computing device and the software and hardware of the slave computing device. The host computing device or a virtual machine program running on the host computing device can set correct data access authority based on its own data and the condition of the processing processes, and the access authority may also be automatically mirrored to the slave computing device, thereby ensuring the security of the slave computing device's access to local data.

The computing system and method of the present application can be used in many applications. In the following, the utilization of the computing system and the method of the present application is illustrated with reference to a subsystem application "vector similarity comparison query" commonly used in a recommendation system.

In recommendation systems or image or text query systems, it is often desired to vectorize huge amount of original data (text, voice, image, user history information, etc.) to form a feature vector database representing the original data. Since the size of the feature vector database is too large to query, it is desired to establish an index file of the feature vector database. In this way, in the subsequent use of the vector database, comparison and search can be performed between the feature vector of the data to be queried and the feature vector index file, so as to obtain the mapping relationship between the input query data and the original data.

In the existing recommendation system server, the creation and indexing of the vector database of original data can be completed and stored in the memory of a host computing device by the host computing device (such as a central processing unit). The host processor or virtual machine program can access the vector index file through the memory page table in the host MMU and the host computing device (indicating the mapping relationships between the host device physical addresses and the host device virtual addresses), and the slave computing device is not involved in this process. When a slave computing device with a local memory device such as a GPU is used for query computations, such as comparison and search of query vector distances, the slave computing device needs to request data from the host computing device. In response to this request, the current index data block in the host device memory needs to be copied to a local device memory of the slave computing device to perform matching computations with the input query vector. The existing recommendation system server needs to repeatedly request index data blocks every time it receives a query request, which may affect the performance and power consumption of the entire system.

However, the computing system of the present application can share the respective device memories of different computing devices and allow the host computing device and the processing processes (such as virtual machine programs) running on it to directly access the local memories of the slave computing devices. The vector database of original data can be directly written into the slave device memory during an initialization process, thereby establishing a unified address space for the host computing device and the slave computing device. When the slave computing device needs to be called to query an input query vector, the slave processor of the slave computing device may request the relevant address mapping relationships of the system memory page table from the host computing device and stores them locally, and then direct and high-speed address mapping and access to the local data can be realized. This simplifies the data access process of the system and improves computing performance.

In the above examples, the programs or processes running on the host computing device can directly write the generated vector index file into the virtualized host device memory. This process only involves the host software, the system memory page table, and the host device memory. It is not desired to synchronize between the host device and the slave computing device. It can be seen that the virtualization of the memory in the slave computing device does not affect the normal access of the host computing device to the host device memory.

When the slave computing device performs computation and query based on a part of the vector index file stored in the slave computing device, the slave computing device doesn't need to request the host computing device to copy the index file to the slave device memory multiple times, but can automatically query the locally mirrored slave device memory page table based on the data access requests including the virtual addresses sent from the slave processor. If the corresponding page table entry is missing, the MMU of the slave computing device can request page table entries from the host computing device once and store the mirror entries of the page table entries in the slave device memory page table. The mirror entries remain valid until the completion of the computing task. In this way, when the virtual addresses are accessed again during the execution of the computing task by the slave processor, the slave computing device can directly use the "mirrored entries" stored in the memory page table of the slave device for local translation. In addition, since the slave device memory is virtualized on the slave computing device, it is transparent to the processing processes running on the host computing device and the slave computing device, and the processing processes running on the host and slave computing devices all can use the starting address of a same vector index file (virtual address) to access the data index and perform computation on the data accessed. This process minimizes the cost in communication between the host computing device and the slave computing device and improves the computing efficiency of the system.

In the present application, the management of adding and deleting mirroring page tables is actually coordinately implemented by software running on a host computing device and software and hardware of a slave computing device. The host computing device or a virtual machine program running on it can set correct data access authorities based on its own data and the situation of processes, which can also be automatically mirrored to the slave computing device, thereby ensuring the security of the slave computing device's access to local data.

It should be noted that although several modules or sub-modules, steps or sub-steps of a computing system and a method for sharing device memories of different computing devices in the computing system are mentioned in the above detailed description, this division is only exemplary but not mandatory. In fact, according to the embodiments of the present application, the features and functions of two or more modules described above can be embodied in one module. Conversely, the features and functions of a module described above can be further divided into multiple modules to be embodied.

Those of ordinary skill in the art can understand and implement other changes to the disclosed embodiments by studying the description, the content of the disclosure, the drawings and the appended claims. In the claims, the word "comprise" does not exclude other elements and steps, and the word "a" and "an" do not exclude plurals. In the actual application of this application, one part may perform the functions of multiple technical features cited in the claims. Any reference signs in the claims should not be construed as limiting the scope.

What is claimed is:

1. A computing system, comprising:
   a host computing device, the host computing device comprising:
      a host processor for running one or more processing processes;
      a host device memory having a plurality of host storage units addressable and accessible through respective host device physical addresses, and the host device memory storing, for each of the processing processes, a system memory page table indicating mapping relationships between virtual addresses of each of the processing processes and system physical addresses, wherein the host device physical addresses are a part of the system physical addresses; and
   a host address mapping management unit for managing the system memory page table, and for converting, in response to a data access request from a processing process of the processing processes running on the host processor, requested virtual addresses into host device physical addresses based on the system memory page table to allow the processing process running on the host processor to access corresponding host storage units;
   a slave computing device coupled to the host computing device through a data bus to exchange data therewith, wherein the slave computing device comprises:
      a slave processor callable by the host processor to assist the host processor in running the processing processes;

a slave device memory having a plurality of slave storage units that can be addressable and accessible through respective slave device physical addresses, wherein the slave device physical addresses are a part of the system physical addresses;

wherein the slave device memory stores a slave device memory page table including at least a part of the system memory page table, and the part of the system memory page table comprises mapping relationships between virtual addresses and system physical addresses which is requested and received by the slave computing device from the host computing device according to a data access request of a processing process of the processing processes running on the slave computing device processor, wherein the mapping relationships are used for the processing process running on the slave processor, and the slave device memory page table comprises mapping relationships between virtual addresses of data requested to be accessed and slave device physical addresses; and a slave address mapping management unit for converting, in response to the data access request of the processing process running on the slave processor, requested virtual addresses into slave device physical addresses based on the slave device memory page table, to allow the slave processor to access corresponding slave storage units to assist the host processor in running the processing processes;

wherein the host address mapping management unit is also for managing the system memory page table, and for converting, in response to the data access request of the processing process running on the host processor, requested virtual addresses into slave device physical addresses based on the system memory page table to allow the processing processes running on the host processor to access corresponding slave storage units; and the slave address mapping management unit is also for converting, in response to a data access request of the processing process running on the slave processor, requested virtual addresses into host device physical addresses based on the slave device memory page table, to allow the slave processor to access corresponding host storage units to assist the host processor in running the processing processes.

2. The computing system of claim 1, wherein the slave device memory page table is updated when the system memory page table is updated.

3. The computing system of claim 1, wherein the processing process running on the host processor is a virtual machine process, and the virtual addresses are virtual machine physical addresses provided by the virtual machine process; wherein the host device memory is configured to further store a virtual machine memory page table that represents mapping relationships between virtual machine virtual addresses and virtual machine physical addresses, and wherein the slave device memory page table comprises mapping relationships between virtual machine virtual addresses and slave device physical addresses.

4. The computing system of claim 1, wherein each mapping relationship between a virtual address and a system physical address in the slave device memory page table is associated with a corresponding processing process, and the slave address mapping management unit is configured to only allow each processing process to access system physical addresses based on the mapping relationships between virtual addresses and system physical addresses which are associated with the processing process.

5. The computing system of claim 4, wherein each mapping relationship between a virtual address and a system physical address in the slave device memory page table is associated with a corresponding processing process and a corresponding access authority, and the slave address mapping management unit is configured to only allow each processing process to access system physical addresses based on the mapping relationships between virtual addresses and system physical addresses and access authorities which are associated with the processing process.

6. The computing system of claim 5, wherein the data access request comprises a process identifier to indicate a processing process requesting access and a virtual address requested to be accessed.

7. The computing system of claim 4, wherein the data access request comprises a process identifier to indicate a processing process requesting access and a virtual address requested to be accessed.

8. A method for sharing device memories of different computing devices in a computing system, wherein the computing system comprises a host computing device having a host device memory and a slave computing device having a slave device memory, and the slave computing device is coupled to the host computing device through a data bus to exchanged data therewith; and the method comprises:

storing, for each of one or more processing processes, a system memory page table representing mapping relationships between virtual addresses and system physical addresses in the host device memory, wherein the system physical addresses comprise host device physical addresses for addressing and accessing respective host storage units in the host device memory and slave device physical addresses for addressing and accessing respective slave storage units in the slave device memory;

converting requested virtual addresses into host device physical addresses or slave device physical addresses based on the system memory page table by a host address mapping management unit of the host computing device in response to a data access request of a processing process of the processing processes running on the host computing device, to allow the host computing device to access corresponding host storage units or slave storage units;

storing a slave device memory page table in the slave device memory, wherein the slave device memory page table comprises at least a part of the system memory page table which comprises mapping relationships between virtual addresses and system physical addresses that are requested and received by the slave computing device from the host computing device according to a data access request of a processing process of the processing processes running on the slave computing device, wherein the mapping relationships are used for the processing process running on the slave computing device, and the slave device memory page table comprises mapping relationships between virtual addresses of data requested to be accessed and slave device physical addresses; and converting requested virtual addresses into host device physical addresses or slave device physical addresses based on the slave device memory page table by a slave address mapping management unit of the slave computing device in response to a data access request of the processing process running on the slave computing device, to allow the slave computing device to access corresponding host storage units or slave storage units to assist the host computing device in running the processing processes.

9. The method of claim 8, wherein the processing process running on the host computing device is a virtual machine process, and the virtual addresses are virtual machine physical addresses provided by the virtual machine process; wherein the host device memory is configured to further store a virtual machine memory page table that represents mapping relationships between virtual machine virtual addresses and virtual machine physical addresses, wherein the slave device memory page table comprises mapping relationships between virtual machine virtual addresses and slave device physical addresses.

10. The method of claim 8, wherein each mapping relationship between a virtual address and a system physical address in the slave device memory page table is associated with a corresponding processing process, and the slave address mapping management unit is configured to only allow each processing process to access corresponding system physical addresses based on mapping relationships between virtual addresses and system physical addresses which are associated with the processing process.

11. The method of claim 10, wherein each mapping relationship between a virtual address and a system physical address in the slave device memory page table is associated with a corresponding processing process and a corresponding access authority, and the slave address mapping management unit is configured to only allow each processing process to access corresponding system physical addresses based on mapping relationships between virtual addresses and system physical addresses and access authorities which are associated with the processing process.

12. The method according to claim 11, wherein the data access request comprises a process identifier to indicate a processing process requesting access and a virtual address requested to be accessed.

13. The method according to claim 10, wherein the data access request comprises a process identifier to indicate a processing process requesting access and a virtual address requested to be accessed.

* * * * *